US007974997B2

(12) United States Patent
Arviv et al.

(10) Patent No.: US 7,974,997 B2
(45) Date of Patent: Jul. 5, 2011

(54) HARDWARE MATRIX COMPUTATION FOR WIRELESS RECEIVERS

(75) Inventors: Eliahou Arviv, Modin (IL); Robert L. Lang, East Lindfield (AU); Yi-Chen Li, Sydney (AU); Oliver Ridler, Thornleigh (AU); Xiao-an Wang, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 1131 days.

(21) Appl. No.: 11/731,174

(22) Filed: Mar. 30, 2007

(65) Prior Publication Data

US 2008/0243982 A1    Oct. 2, 2008

(51) Int. Cl.
*G06F 17/16* (2006.01)
(52) U.S. Cl. ..................................... 708/520
(58) Field of Classification Search .................. None
See application file for complete search history.

(56) References Cited

U.S. PATENT DOCUMENTS

| | | | |
|---|---|---|---|
| 5,193,187 A * | 3/1993 | Strout et al. ................. | 710/261 |
| 6,944,747 B2 * | 9/2005 | Nair et al. .................... | 712/35 |
| 7,389,404 B2 * | 6/2008 | Nair et al. .................... | 712/35 |
| 7,536,431 B2 * | 5/2009 | Goren et al. ................. | 708/831 |
| 2002/0198911 A1 * | 12/2002 | Blomgren et al. ............ | 708/232 |
| 2004/0111587 A1 * | 6/2004 | Nair et al. .................... | 712/34 |
| 2004/0243657 A1 * | 12/2004 | Goren et al. ................. | 708/607 |
| 2006/0101245 A1 * | 5/2006 | Nair et al. .................... | 712/221 |
| 2007/0038843 A1 * | 2/2007 | Trivedi et al. ................ | 712/34 |

* cited by examiner

*Primary Examiner* — David H Malzahn
(74) *Attorney, Agent, or Firm* — Mendelsohn, Drucker & Associates, P.C.; Kevin M. Drucker; Steve Mendelsohn

(57) ABSTRACT

In one embodiment, a receiver including one or more signal-processing blocks and a hardware-based matrix co-processor. The one or more signal-processing blocks are adapted to generate a processed signal from a received signal. The hardware-based matrix co-processor includes two or more different matrix-computation engines, each adapted to perform a different matrix computation, and one or more shared hardware-computation units, each adapted to perform a mathematical operation. At least one signal-processing block is adapted to offload matrix-based signal processing to the hardware-based matrix co-processor. Each of the two or more different matrix-computation engines is adapted to offload the same type of mathematical processing to at least one of the one or more shared hardware-computation units.

17 Claims, 4 Drawing Sheets

HARDWARE MATRIX COMPUTATION FOR WIRELESS RECEIVERS

BACKGROUND OF THE INVENTION

1. Field of the Invention

The present invention relates to data transmission systems, and, in particular, to equalizer-based receivers.

2. Description of the Related Art

Code-Division Multiple-Access (CDMA) systems allow many users simultaneously to access a given frequency allocation. User separation at the receiver is possible because each user spreads its respective modulated data waveform over a wide bandwidth using a unique spreading code, prior to transmitting the waveform. Such spreading typically involves, e.g., multiplying the data waveform with a user-unique high-bandwidth pseudo-noise binary sequence. At the receiving end, the receiver re-multiplies the signal with the pseudo-noise binary sequence to remove substantially all of the pseudo-noise signal, so that the remaining portion of the signal is just the original data waveform. Ordinarily, users spread their signals using codes that are orthogonal to each other, i.e., do not interfere with one another. However, a common problem is inter-symbol interference (ISI), i.e., distortion of a received signal typically manifested in the temporal spreading and consequent overlap of individual pulses from nearby users to the degree that a receiver cannot reliably distinguish between changes of state representing individual signal elements. ISI can present a significant problem if the power level of a desired signal is significantly lower than the power level of an interfering user (e.g., due to distance) and, at a certain threshold, can compromise the integrity of the received data.

One technique for handling ISI is the use of equalizer-based receivers, which are a promising technology for high-speed data transmission systems, such as High-Speed Downlink Packet Access (HSDPA), a standard that is part of the Third-Generation Partnership Project (3GPP). Equalizer-based receivers typically use linear-channel equalizers to restore the orthogonality of spreading sequences lost in frequency-selective channels, thereby suppressing ISI, such as might occur in a downlink operating under the Wide-Band CDMA (WCDMA) standard (a 3GPP technology). Equalizer-based receivers also have the advantage of being of relatively low complexity for short to moderate signal-delay spreads.

One such equalizer-based WCDMA receiver is a Linear Minimum-Mean Square-Error (LMMSE) receiver, which typically trains itself to form an optimal filter relative to a detected channel response and tracks changes in the channel through adaptation. An LMMSE receiver is relatively complex in terms of computations it performs. An example of an LMMSE receiver is illustrated in FIG. 1. As shown, receiver 100 includes a chip-pulsed matched filter 101, an optimum LMMSE filter 102, and a demodulator 103. Chip-pulsed matched filter 101 multiplies a signal received from an analog-to-digital (A/D) converter by its transmitted pulse shape to minimize ISI, and provides the multiplied signal to optimum LMMSE filter 102. Optimum LMMSE filter 102 minimizes the output signal-to-noise ratio (SNR) for a given channel response that is a composite of all of the underlying multipath signals in the channel. In the example of FIG. 1, the channel is static and known, and therefore, a set of optimum filter coefficients can be obtained using Minimum-Mean Square-Error (MMSE) criteria (whereas, in alternative embodiments, if the channel is slowly varying or unknown, then an adaptive filter could be used). Optimum LMMSE filter 102 provides a filtered signal to demodulator 103, which demodulates (e.g., descrambles, despreads, and de-rotates) the filtered signal, resulting in a sequence of symbols that are provided as soft outputs, which are additionally processed (not shown) to generate the hard outputs of LMMSE receiver 100. Each of processing blocks 101, 102, and 103 is coupled to a digital-signal processor (DSP) core 104 via a DSP address and data bus 106 for exchanging instructions and data with DSP core 104.

Using DSP core 104, optimum LMMSE filter 102 performs complex matrix computations, such as computing tap weights. Various components of other advanced receivers employing, e.g., rake or Maximum-Likelihood Sequence Estimation (MLSE) equalizers, also perform complex matrix computations, such as computing tap locations. Typical low-power DSPs for handheld devices employing such advanced receivers do not have enough processing capacity to perform such computations in software. Thus, higher-power and more complex DSPs are often used to enable such computations. However, the use of such DSPs results in higher current consumption and production cost, and, due to the complexity of the calculations, it takes a relatively long time for DSPs to perform such computations.

SUMMARY OF THE INVENTION

Problems in the prior art are addressed in accordance with the principles of the present invention by providing a co-processor for the separate handling of complex matrix computations. In one embodiment of the invention, the co-processor is coupled to a DSP via a DSP address and data bus. The DSP program starts and provides inputs to the co-processor via DSP bus writes. The co-processor then performs the desired computations, stores results in its output registers, and signals the DSP when the computation is complete. The DSP can then read the result from the DSP bus and re-start/re-program the co-processor. Exemplary matrix computations that the co-processor can perform include correlation-matrix generation using estimated channel coefficients, correlation-matrix decomposition, and matrix-solving for tap-weight computation.

In one embodiment, the present invention provides a receiver comprising (i) one or more signal-processing blocks adapted to generate a processed signal from a received signal and (ii) a hardware-based matrix co-processor. The hardware-based matrix co-processor includes (i) two or more different matrix-computation engines, each adapted to perform a different matrix computation, and (ii) one or more shared hardware-computation units, each adapted to perform a mathematical operation. At least one signal-processing block is adapted to offload matrix-based signal processing to the hardware-based matrix co-processor. Each of the two or more different matrix-computation engines is adapted to offload the same type of mathematical processing to at least one of the one or more shared hardware-computation units.

In another embodiment, the present invention provides a method of processing a received signal. The method comprises generating a processed signal from a received signal using one or more signal-processing blocks adapted to implement a signal-processing operation. The signal-processing operation involves a matrix computation. A hardware-based matrix co-processor is used for the matrix computation. The matrix computation involves at least one mathematical operation. One or more shared hardware-computation units of the matrix co-processor are used to perform the mathematical operation. The matrix computation offloads the same type of mathematical processing to at least one of the one or more shared hardware-computation units.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
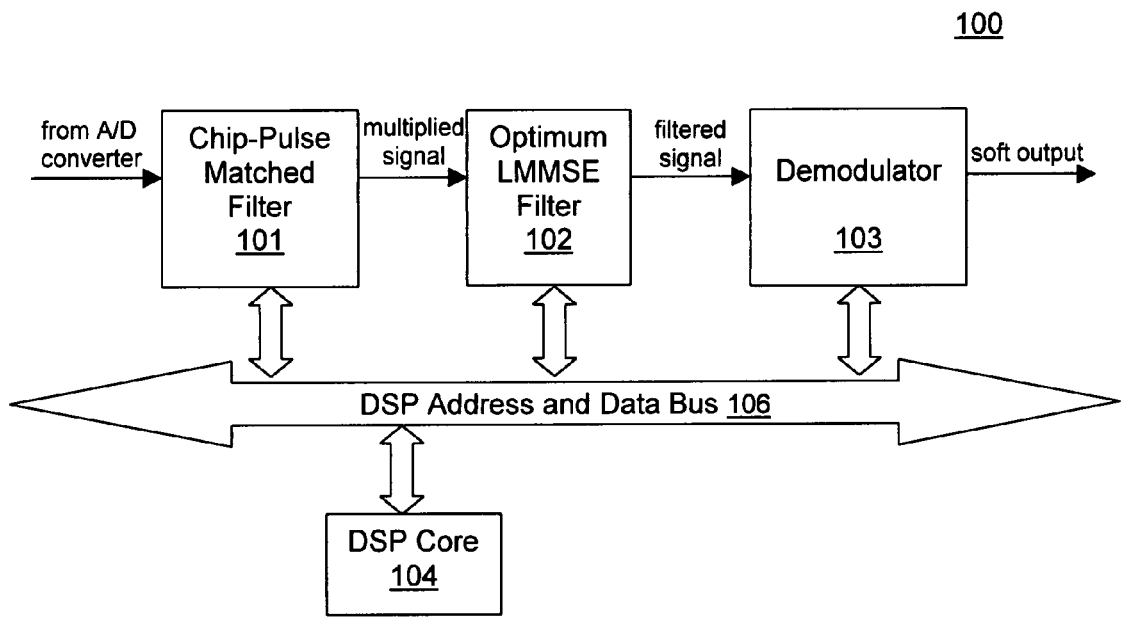
FIG. 1 is a block diagram illustrating an exemplary prior-art Linear Minimum-Mean Square-Error (LMMSE) receiver.
Figure 2:
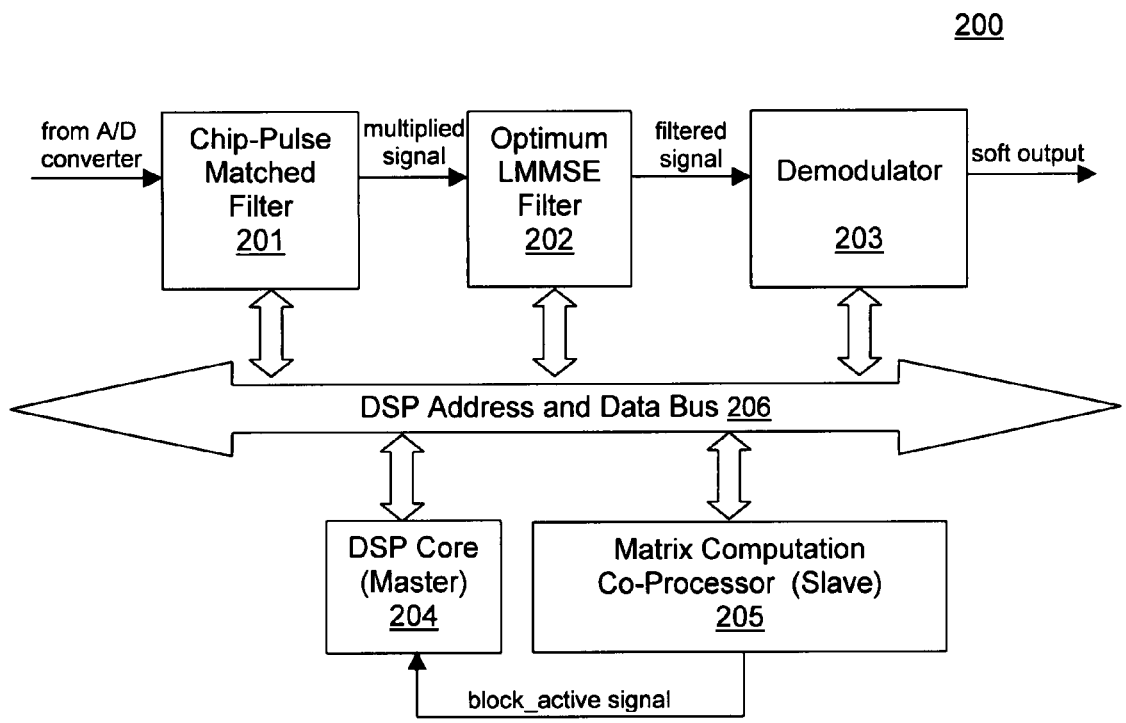
FIG. 2 is a block diagram illustrating an exemplary LMMSE receiver consistent with one embodiment of the present invention.

With reference to FIG. 2, an exemplary LMMSE receiver 200 consistent with one embodiment of the present invention is illustrated. Blocks 201, 202, and 203 perform the same functions as blocks 101, 102, and 103 of FIG. 1, described above. However, unlike DSP core 104 of FIG. 1, DSP core 204 does not perform certain matrix computations, which are instead performed by a hardware matrix-computation co-processor 205 that serves as a slave device to master device DSP core 204.

In operation, a program executing on DSP core 204 starts and provides inputs to co-processor 205 via DSP bus writes. Co-processor 205 performs the desired computations, stores the results in its output registers (311 of FIG. 3), and signals DSP core 204 when the computation is complete. DSP core 204 can then read the result via DSP bus 206 and re-start/re-program co-processor 205, as needed. The completion of the computation is signaled to DSP core 204 using signal block_active generated by co-processor 205, by which DSP core 204 monitors the completion of computation operations it initiates, to coordinate the timing of computation results being read out from output registers 311.

Figure 3:
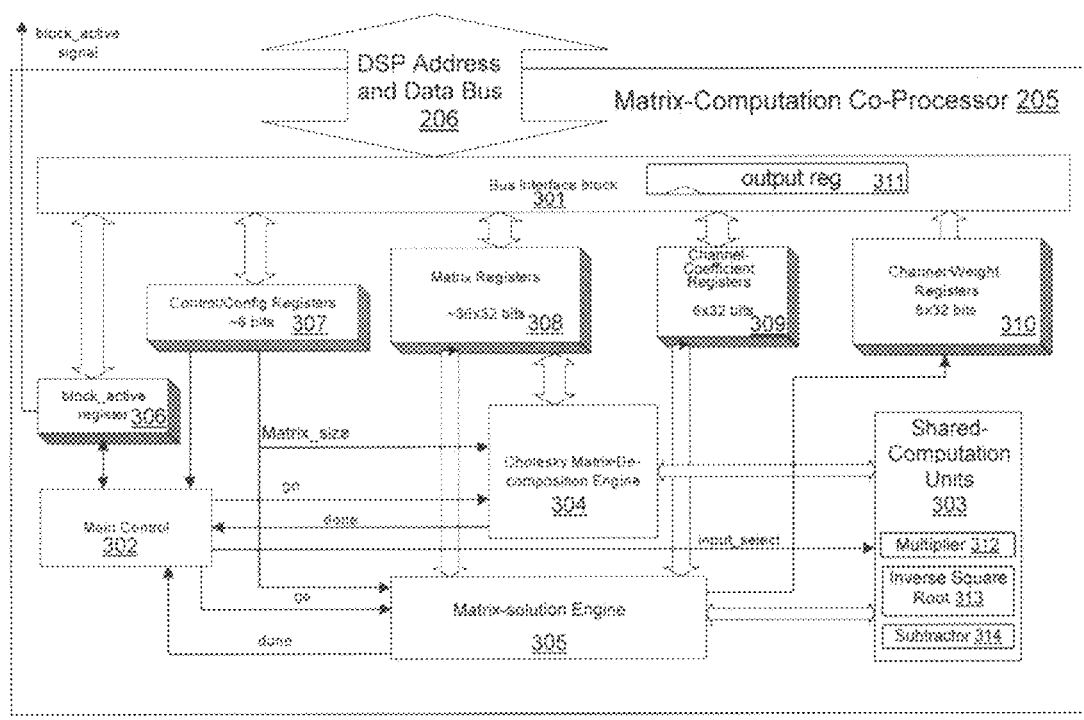
FIG. 3 is a block diagram illustrating the components of the co-processor of FIG. 2.

Turning now to FIG. 3, a block diagram illustrates the components of exemplary co-processor 205 of FIG. 2. As shown, co-processor 205 includes a bus interface block 301, a main control block 302, a shared-computation unit block 303, a Cholesky matrix-decomposition engine 304, and a matrix-solution engine 305. Co-processor 205 also includes several register sets: a block_active register 306, control/configuration registers 307, matrix registers 308, channel-coefficient registers 309, channel-weight registers 310, and output registers 311.

Bus interface block 301 couples co-processor 205 to DSP core 204 of FIG. 2 via DSP address and data bus 206. Co-processor 205 is thus controlled by DSP core 204 using address-read and address-write operations. Bus interface block 301 controls the reading and writing of internal input/output registers 306, 307, 308, 309, 310, and 311, which are shared among the various processing blocks of co-processor 205.

Main control block 302 includes a state machine that controls and monitors the starting and stopping of each of matrix-computation engines 304, 305 based on one or more signals provided by software-programmable mode registers stored in control/configuration registers 307. These signals cause main control block 302 to initiate a computation operation when asserted. To start a computation operation, main control block 302 asserts and supplies to either of engines 304 and 305 a go signal, and the respective one of engines 304, 305 asserts and supplies to main control block 302 a done signal to indicate that the computation process has been completed. Main control block 302 uses this done signal to generate and store in block_active register 306 an indication of whether co-processor 205 has finished processing or is still in the process of computation, and a corresponding block_active signal is provided to DSP core 204 to reflect this state.

Main control block 302 asserts an input_select signal, which is provided to shared-computation unit block 303 to control switching between whether shared-computation unit block 303 exchanges data with Cholesky matrix-decomposition engine 304 or with matrix-solution engine 305. Control/configuration registers 307 also provide signal matrix_size to engines 304, 305, which indicates a value programmed into registers 307 by DSP core 204 that represents the size of the matrix. Control/configuration registers 307 may provide other parameters to main control block 302 and/or other blocks for additional or alternative functionality.

Matrix registers 308, which may be, e.g., 36×32-bit registers, are written by DSP core 204 before a matrix operation begins and contain the matrix on which the operation is to be performed. When Cholesky matrix-decomposition engine 304 is used, matrix registers 308 are also used to store the resulting decomposed matrix.

Channel-coefficient registers 309, which may be, e.g., 6×32-bit registers, store channel coefficients provided by DSP core 204 and used by matrix-solution engine 305 in solving matrices. Channel-weight registers 310, which are, e.g., 6×32-bit registers, store channel weights generated by matrix-solution engine 305 as the result of solving matrices.

The various processing blocks of co-processor 205 share shared-computation unit block 303, which provides a pool of standard complex-arithmetic computational units. These computational units, in this embodiment, include a 4×32-bit complex multiplier 312, an inverse square-root computer 313, and a subtractor 314. Complex multiplier 312 can compute one complex multiplication operation at a time. The area, speed, and/or current consumption of the design can be optimized in different embodiments to meet different requirements by using different numbers and configurations of computation units in shared-computation unit block 303, and in particular, by adding faster units, pipelining, and additional multipliers to further increase computation speed.

Matrix computations are carried out by matrix-computation engines 304 and 305, which are implemented as hardware state machines. While, in this embodiment, co-processor 205 includes two such engines, i.e., Cholesky matrix-decomposition engine 304 and matrix-solution engine 305, in alternative embodiments, alternative or additional matrix calculation engines could be provided to handle other matrix operations and/or calculations. Exemplary matrix computations that co-processor 205 can perform in various embodiments of the invention include, without limitation, correlation matrix generation using estimated channel coefficients, correlation matrix decomposition, and matrix-solving for tap-weight computation. The hardware state machines of matrix-computation engines 304, 305 are designed to handle different matrix sizes, depending on the number of taps required.

Cholesky matrix-decomposition engine 304 is a hardware state machine and register controller that implements the task of Cholesky matrix decomposition. When active, Cholesky matrix-decomposition engine 304 reads matrix coefficients stored in matrix registers 308 and drives shared-computation units 303 to decompose (invert) a matrix. The resulting decomposed matrix is stored back into matrix registers 308. Cholesky matrix decomposition is discussed in further detail, e.g., in Allen et al., *Numerical Analysis for Applied Science* (Oxford Univ. Press, 2002), pp. 130-133.

Figure 4:
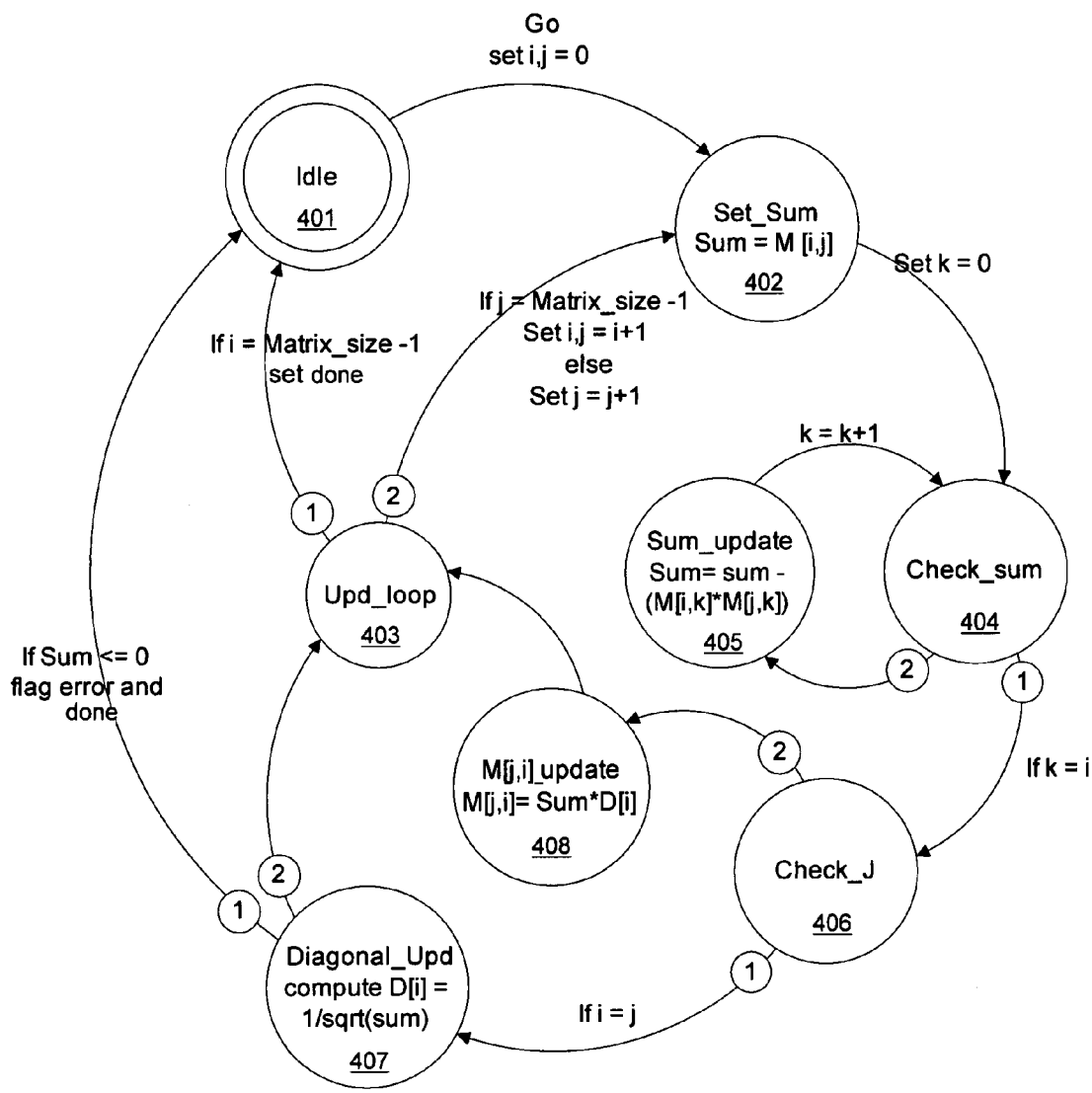
FIG. 4 is a state diagram illustrating the states of the Cholesky matrix-decomposition engine of FIG. 3.

Turning now to FIG. 4, an exemplary state diagram for Cholesky matrix-decomposition engine 304 of FIG. 3 is shown. In this embodiment, a matrix on which the decomposition operation is performed is stored in matrix registers 308 as two-dimensional matrix M[i,j], and the result of the decomposition operation is stored back into the same matrix registers 308 as matrix M[i,j]. The variables i, j, and k are counters for controlling computation loops.

To minimize hardware cost, multiplication, subtraction, and inverse square-root operations shown in the state diagram are performed within shared-computation unit block 303, by multiplier 312, subtractor 314, and inverse square-root computer 313, respectively.

The variable Sum stores interim calculation results obtained during the decomposition operation. A one-dimensional matrix D[i] references the diagonal elements of matrix M[i,i], i.e., D[1]=M[1,1], D[2]=M[2,2], D[3]=M[3,3], and so forth. The elements of D[i] are computed differently from the other elements of matrix M in that the elements of D[i] are computed first in each row and are then used to compute the other elements of that row.

The transitions from one state to multiple possible states are numbered ① and ②, wherein a transition numbered ① occurs when the condition appearing next to the ① indicator is true, and a transition numbered ② occurs when the condition appearing next to the ① indicator is not true.

The state machine defaults to Idle state 401. Assertion of the go signal causes the state machine to initialize counters i and k to zero values, after which the state machine transitions to Set_Sum state 402.

At Set_Sum state 402, the variable Sum is assigned the value M[i,j], after which the state machine sets k to a zero value and transitions to Check_sum state 404.

At Check_sum state 404, a determination is made whether k is equal to i, in which case the state machine transitions to Check_J state 406. If, at Check_sum state 404, k is determined not to be equal to i, then the state machine transitions to Sum_update state 405, wherein the value of Sum is reduced by the product of M[i,k] and M[j,k], the value of k is incremented by one, and the state machine transitions back to Check_sum state 404.

At Check_J state 406, a determination is made whether i is equal to j, in which case the state machine transitions to Diagonal_Upd state 407. If, at Check_J state 406, i is determined not to be equal to j, then the state machine transitions to M[j,i]_update state 408, wherein M[j,i] is assigned a value equal to the product of Sum and D[i], and the state machine transitions to Upd_loop state 403.

At Diagonal_Upd state 407, D[i] is computed by taking the inverse square root of Sum, and a determination is made whether Sum is less than or equal to zero, in which case an error flag is generated, the decomposition operation terminates, and the state machine returns to Idle state 401. If Sum is not less than or equal to zero, then the state machine transitions to Upd_loop state 403.

At Upd_loop state 403, a determination is made whether i has reached (Matrix_size—1), in which case the done signal is asserted, the decomposition operation terminates, and the state machine returns to Idle state 401. At this point, the decomposed matrix that results from the decomposition operation now exists in matrix M[i,j]. If i has not reached (Matrix_size—1), then a determination is made whether j has reached (Matrix_size—1), in which case i and j are assigned a value of i+1, and the state machine transitions to Set_Sum state 402. If j has not reached (Matrix_size—1), then j is assigned a value of j+1, and the state machine transitions to Set_Sum state 402.

Matrix-solution engine 305 is a hardware state machine and register controller that implements the task of solving an equation corresponding to a matrix. This matrix will typically be one that has just been decomposed by Cholesky matrix-decomposition engine 304 and is already stored in matrix registers 308, thereby eliminating the need to route this data in back-and-forth manner to/from a generalized DSP, as in the case of conventional receivers. When active, matrix-solution engine 305 reads matrix coefficients stored in matrix registers 308 and drives shared-computation units 303 to solve the matrix using channel coefficients stored in channel-coefficient registers 309. The resulting solution, which represents the channel weights for each multipath that can be used by LMMSE receiver 200 of FIG. 2, is stored in channel-weight registers 310.

Figure 5:
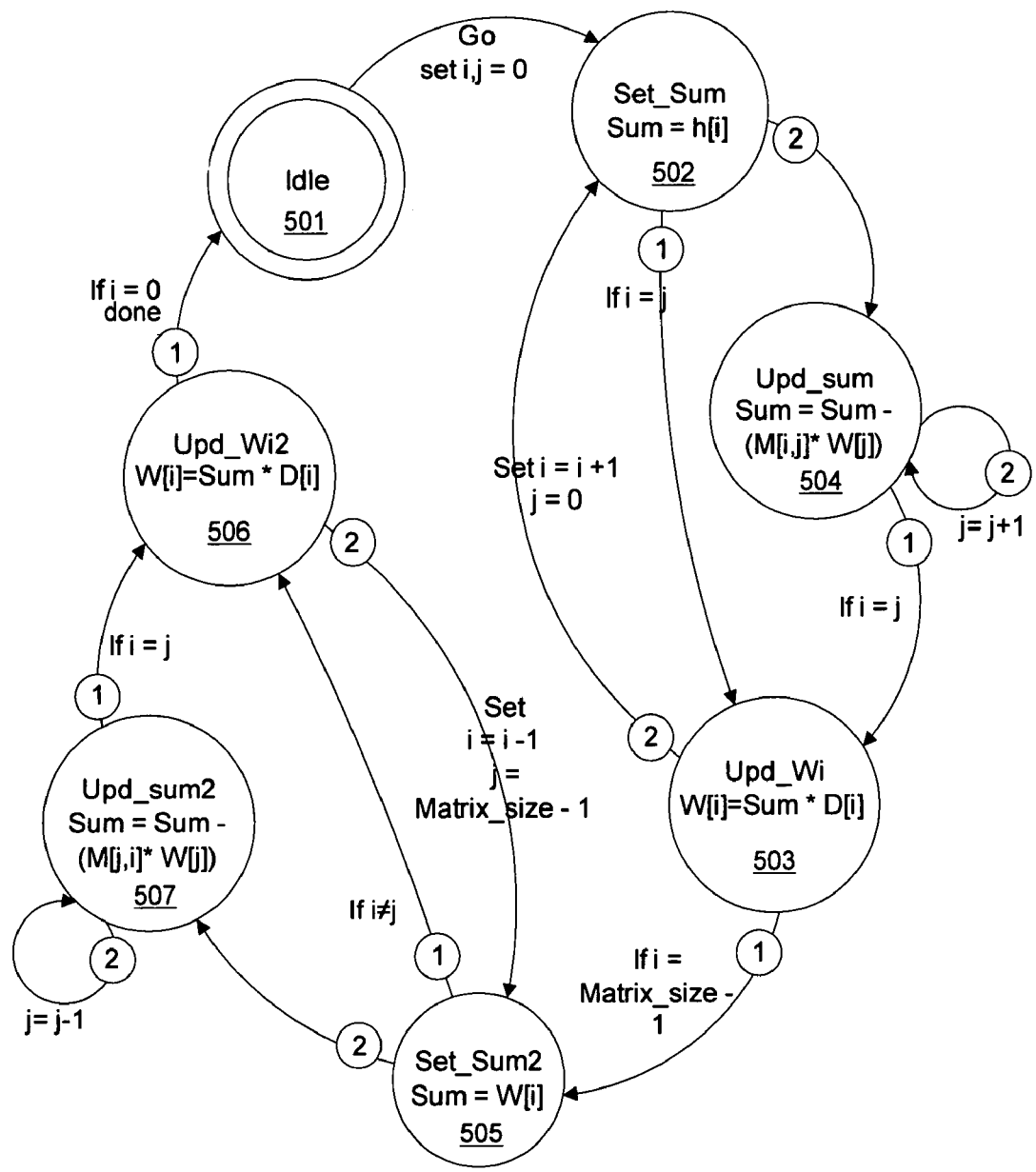
FIG. 5 is a state diagram illustrating the states of the matrix-solution engine of FIG. 3.

Turning now to FIG. 5, an exemplary state diagram for matrix-solution engine 305 of FIG. 3 is shown. In this embodiment, the matrix on which the matrix-solution operation is performed is stored in matrix registers 308 as a two-dimensional matrix M[i,j], the channel coefficients are stored in channel-coefficient registers 309 as a one-dimensional matrix h[i], and the result of the matrix-solution operation is stored in channel-weight registers 310 as one-dimensional matrix W[i]. The variables i and j are counters for controlling computation loops.

To minimize hardware cost, multiplication, subtraction, and inverse square-root operations shown in the state diagram are performed within shared-computation unit block 303, by multiplier 312, subtractor 314, and inverse square root computer 313, respectively.

The variable Sum stores interim calculation results obtained during the solution operation. A one-dimensional matrix D[i] references the diagonal elements of matrix M[i,i], i.e., D[1]=M[1,1], D[2]=M[2,2], D[3]=M[3,3], and so forth. The elements of D[i] are used as variables to scale result W[i].

The transitions from one state to multiple possible states are numbered ① and ②, wherein a transition numbered ① occurs when the condition appearing next to the ① indicator is true, and a transition numbered ② occurs when the condition appearing next to the ① indicator is not true.

The state machine defaults to Idle state 501. Assertion of the go signal causes the state machine to initialize counters i and j to zero values, after which the state machine transitions to Set_Sum state 502.

At Set_Sum state 502, the variable Sum is assigned the value h[i], and a determination is made whether i is equal to j, in which case the state machine transitions to Upd_Wi state 503. If, at Set_Sum state 502, i is determined not to be equal to j, then the state machine transitions to Upd_sum state 504.

At Upd_Wi state 503, W[i] is assigned a value equal to the product of Sum and D[i], and then a determination is made whether i has reached (Matrix_size—1), in which case the state machine transitions to Set_Sum2 state 505.

At Upd_sum state 504, the variable Sum is reduced by the product of M[i,j] and W[j], and a determination is made whether i is equal to j, in which case the state machine transitions to Upd_Wi state 503. If, at Upd_sum state 504, i is determined not to be equal to j, then j is incremented by one, the variable Sum is reduced by the product of M[i,j] and W[j], and the state machine loops back to Upd_sum state 504. If, at Upd_Wi state 503, it is determined that i has not reached (Matrix_size—1), then the value of i is incremented by one, the value of j is set to zero, and the state machine transitions back to Set_Sum state 502.

At Set_Sum2 state 505, Sum is assigned the value of W[i], and a determination is made whether i is not equal to j, in which case the state machine transitions to Upd_Wi2 state 506. If, at Set_Sum2 state 505, it is determined that i is equal to j, then the state machine transitions to Upd_sum2 state 507.

At Upd_Wi2 state 506, W[i] is assigned a value equal to the product of Sum and D[i], and a determination is made whether i is equal to zero, in which case the done signal is asserted, the solution operation terminates, and the state machine returns to Idle state 501. At this point, the solution to matrix M[i,j] now exists in matrix W[i]. If, at Upd_Wi2 506 state, it is determined that i is not equal to zero, then i is decremented by one, j is assigned the value of (Matrix_size—1), and the state machine returns to Set_Sum2 state 505.

At Upd_sum2 state 507, Sum is decremented by a value equal to the product of M[j,i] and W[j], and a determination is made whether i is equal to j, in which case the state machine transitions to Upd_Wi2 state 506. If, at Upd_sum2 state 507, it is determined that i is not equal to j, then j is decremented by one, Sum is decremented by a value equal to the product of M[j,i] and W[j], and the state machine loops back to Upd_sum2 state 507.

Once either of engines 304, 305 terminates its operation, the result of the operation is read into output registers 311 from matrix registers 308 or 309, respectively, so that the result can be read out via DSP address and data bus 206 by DSP core 204 as soon as co-processor 205 de-asserts the block_active signal.

It should be recognized that a matrix-computation co-processor consistent with the present invention can be used in a variety of different communications devices, including without limitation, equalizer-based LMMSE wireless receivers (for resolving channel weights) and G-rake wireless receivers (for tap selection and resolving channel weights).

Although the foregoing description describes a programmable processing core implementing one or more of the signal-processing blocks in one embodiment of a receiver consistent with the present invention, it should be understood that a programmable processing core is not necessary in certain embodiments, and that a programmable processing core could alternatively be used to implement a dedicated hardware datapath between at least one of the signal-processing blocks and one or more of (i) another signal-processing block and (ii) a hardware-based matrix co-processor.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A receiver comprising:
   one or more signal-processing blocks adapted to generate a processed signal from a received signal; and
   a hardware-based matrix co-processor comprising:
   two or more different matrix-computation engines, each adapted to perform a different matrix computation; and
   one or more shared hardware-computation units, each adapted to perform a mathematical operation, wherein:
   at least one signal-processing block is adapted to offload matrix-based signal processing to the hardware-based matrix co-processor; and each of the two or more different matrix-computation engines is adapted to offload the same type of mathematical processing to at least one of the one or more shared hardware-computation units.

2. The invention of claim 1, further comprising one or more memories.

3. The invention of claim 2, wherein the one or more memories comprise a block active register for storing an indicator of whether the matrix co-processor is in the process of performing a matrix computation.

4. The invention of claim 2, wherein the one or more memories comprise one or more matrix registers for storing elements of a matrix in connection with in a matrix computation.

5. The invention of claim 2, wherein the one or more memories comprise one or more channel-coefficient registers for storing channel coefficients in connection with a matrix computation.

6. The invention of claim 2, wherein the one or more memories comprise one or more channel-weight registers for storing channel weights in connection with a matrix computation.

7. The invention of claim 1, wherein the one or more shared hardware-computation units comprise at least one of a multiplier, an inverse square root computer, and a subtractor.

8. The invention of claim 1, wherein the two or more different matrix-computation engines comprise a matrix-decomposition engine.

9. The invention of claim 8, further comprising one or more memories, wherein:
   the one or more memories comprise one or more matrix registers for storing elements of an original matrix for decomposition by the matrix-decomposition engine; and
   the elements of a decomposed matrix provided by the matrix-decomposition engine are stored in the same memory locations of the matrix registers at which the original matrix were previously stored.

10. The invention of claim 1, wherein the two or more different matrix-computation engines comprise a matrix-solution engine.

11. The invention of claim 10, further comprising:
    one or more memories, wherein the one or more memories comprise:
       one or more matrix registers for storing elements of an original matrix to be solved by the matrix-solution engine;
       one or more channel-coefficient registers for storing channel coefficients provided to the matrix-solution engine for solving the original matrix; and
       one or more channel-weight registers for storing channel weights provided by the matrix-solution engine as a result of solving the original matrix.

12. The invention of claim 1, wherein the receiver is a rake-based or equalizer-based Linear Minimum-Mean Square-Error (LMMSE) receiver.

13. The invention of claim 1, wherein the at least one signal-processing block is a chip-pulse matched filter, a Linear Minimum-Mean Square-Error (LMMSE) filter, or a demodulator.

14. The invention of claim 1, further comprising an address and/or data bus coupling at least one of the signal-processing blocks to at least one of (i) another signal-processing block and (ii) the hardware-based matrix co-processor.

15. The invention of claim 1, further comprising a programmable processing core adapted to implement one or more of the signal-processing blocks.

16. The invention of claim 1, further comprising a programmable processing core adapted to implement a dedicated hardware datapath coupling at least one of the signal-processing blocks to at least one of (i) another signal-processing block and (ii) the hardware-based matrix co-processor.

17. A method of processing a received signal comprising:
    generating a processed signal from a received signal using one or more signal-processing blocks adapted to implement a signal-processing operation;
    wherein:
       the signal-processing operation involves a matrix computation;
       a hardware-based matrix co-processor is used for the matrix computation;
       the matrix computation involves at least one mathematical operation;
       one or more hardware-computation units of the matrix co-processor are used to perform the mathematical operation; and
       the matrix computation offloads the same type of mathematical processing to at least one of the one or more hardware-computation units.

* * * * *